United States Patent
Erdtmann et al.

(10) Patent No.: US 6,254,670 B1
(45) Date of Patent: Jul. 3, 2001

(54) ADDITIVE FOR INK JET INK

(75) Inventors: David Erdtmann, Rochester; Alan R. Pitt, Sandridge; Thomas E. Kocher; Thomas W. Martin, both of Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/472,484

(22) Filed: Dec. 27, 1999

(51) Int. Cl.$^7$ .................................................. C09D 11/02
(52) U.S. Cl. ..................................... 106/31.86; 106/31.89
(58) Field of Search ................................ 106/31.86, 31.89

(56) References Cited

U.S. PATENT DOCUMENTS

| | | | |
|---|---|---|---|
| 4,395,287 | * 7/1983 | Kobayashi et al. | 106/31.86 |
| 5,688,311 | * 11/1997 | Adamic | 106/31.86 |
| 5,754,194 | * 5/1998 | Endo et al. | 347/15 |
| 5,779,778 | * 7/1998 | Gregory et al. | 106/31.27 |
| 5,779,781 | * 7/1998 | Gregory et al. | 106/31.51 |
| 5,833,744 | 11/1998 | Breton et al. | 106/31.59 |
| 5,922,117 | * 7/1999 | Malhotra et al. | 106/31.86 |
| 6,007,182 | * 12/1999 | Matsubara et al. | 430/43 |

* cited by examiner

*Primary Examiner*—Helene Klemanski
(74) *Attorney, Agent, or Firm*—Harold E. Cole

(57) ABSTRACT

An ink jet ink composition comprising from about 30 to about 90% by weight of water, from about 0.5 to about 30% by weight of a pigment, from about 0.125 to about 7.5% by weight of an anionic dispersant, from about 0.05 to about 2% by weight of an ethoxylated trimethylnonanol, and from about 10 to about 50% by weight of a humectant comprising a polyhydric alcohol.

8 Claims, No Drawings

ADDITIVE FOR INK JET INK

CROSS REFERENCE TO RELATED APPLICATION

Reference is made to commonly-assigned, copending U.S. patent application Ser. No. 09/473,248, filed of even date herewith, (Docket 80323HEC) entitled "Ink Jet Printing Method", by Martin;

U.S. patent application Ser. No. 09/472,483, filed of even date herewith, (Docket 80329HEC) entitled "Ink Jet Printing Method", by Erdtmann et al.; and U.S. patent application Ser. No. 09/472,577, filed of even date herewith, (Docket 80262HEC) entitled "Additive For Ink Jet Ink", by Martin; the teachings of which are incorporated herein by reference.

FIELD OF THE INVENTION

This invention relates to an additive for a pigmented ink jet ink to improve printing reliability.

BACKGROUND OF THE INVENTION

Ink jet printing is a non-impact method for producing images by the deposition of ink droplets on a substrate (paper, transparent film, fabric, etc.) in response to digital signals. Ink jet printers have found broad applications across markets ranging from industrial labeling to short run printing to desktop document and pictorial imaging. The inks used in ink jet printers are generally classified as either dye-based or pigment-based.

A dye is a colorant which is molecularly dispersed or solvated by a carrier. The carrier can be a liquid or a solid at room temperature. A commonly used carrier is water or a mixture of water and organic co-solvents. Each individual dye molecule is surrounded by molecules of the carrier. In dye-based inks, no particles are observable under the microscope. Although there have been many recent advances in the art of dye-based ink jet inks, such inks still suffer from deficiencies such as low optical densities on plain paper and poor light-fastness. When water is used as the carrier, such inks also generally suffer from poor water fastness.

In pigment-based inks, the colorant exists as discrete particles. These pigment particles are usually treated with addenda known as dispersants or stabilizers which serve to keep the pigment particles from agglomerating and settling out of the carrier. Water-based pigmented inks are prepared by incorporating the pigment in the continuous water phase by a milling and dispersing process. Pigmented inks require a water soluble dispersant in the pigment slurry during the milling process. Such a dispersant is necessary to produce a colloidally stable mixture and an ink that can be "jetted" reliably without clogging the print head nozzles.

Dispersing agents in an ink jet ink have the dual function of helping to break down pigments to sub-micron size during the milling process and of keeping the colloidal dispersion stable and free from flocculation for a long period of time.

A requirement in wide format ink jet printers is the delivery of at least 500 ml of ink through a printhead before nozzles begin to fail to fire ink droplets. Reproducible quantities of ink delivered prior to print cartridge failure (ink reliability) and particle size stability, over time, have been problems encountered with ink jet inks containing pigments as colorants and anionic dispersants.

U.S. patent application Ser. No. 09/351,614, filed Jul. 12, 1999, (Docket79666HEC) entitled "Color Pigmented Ink Jet Ink Set" discloses a typical ink jet pigmented ink. However, there is a problem with print cartridges containing those inks in that the print reliability over an extended period of time is not as good as one would desire.

U.S. Pat. No. 5,855,656 relates to an ink jet ink containing a cationic fluorocarbon material. There is a disclosure in this patent that a nonionic surfactant may be used such as Tergitol TMN-10®. However, there is a problem with this combination used in a pigmented ink with an anionic dispersant in that the dispersion is not stable, i.e., the pigment will precipitate out.

It is an object of this invention to provide an additive for a pigmented ink jet ink which would improve the print reliability. It is another object of this invention to provide an additive for a pigmented ink jet ink which would be useful with a variety of pigments. It is still another object of this invention to provide an additive for a pigmented ink jet ink which would not affect the dispersion stability.

SUMMARY OF THE INVENTION

These and other objects are achieved in accordance with this invention which relates to an ink jet ink composition comprising from about 30 to about 90% by weight of water, from about 0.5 to about 30% by weight of a pigment, from about 0.125 to about 7.5% by weight of an anionic dispersant, from about 0.05 to about 2% by weight of an ethoxylated trimethylnonanol, and from about 10 to about 50% by weight of a humectant comprising a polyhydric alcohol.

Use of the ethoxylated trimethylnonanol in the inks of this invention greatly increases the amount of ink that may be delivered before print nozzles begin to fail.

DETAILED DESCRIPTION OF THE INVENTION

As noted above, the ink jet ink composition of the invention contains the ethoxylated trimethylnonanol at a concentration of from about 0.05 to about 2.0 weight percent. In a preferred embodiment, the concentration of the ethoxylated trimethylnonanol is from about 0.075 to about 1.0 weight percent. In another preferred embodiment of the invention, the ethoxylated trimethylnonanol has the formula $C_{12}H_{25}O(CH_2CH_2O)_nH$, where n is from about 3 to about 10, and is made through the reaction of 2,6,8-trimethyl-4-nonanol with ethylene oxide. These materials are sold commercially as Tergitol® TMN-3, -6 and -10 (Union Carbide Corp.).

In the present invention, any of the known organic pigments can be used. Pigments can be selected from those disclosed, for example, in U.S. Pat. Nos. 5,026,427; 5,085,698; 5,141,556; 5,160,370 and 5,169,436, the disclosures of which are hereby incorporated by reference. The exact choice of pigment will depend upon the specific color reproduction and image stability requirements of the printer and application. For four-color printers, combinations of cyan, magenta, yellow and black (CMYK) pigments are used. In a preferred embodiment, the pigment set is cyan pigment, C.I. Pigment Blue 15:3; quinacridone magenta, C.I. Pigment Red 122; C.I. Pigment Yellow 155; and carbon black, C.I. Pigment Black 7. The ink jet ink composition of the invention contains the pigment at a concentration of from about 1% to about 5% by weight of the ink jet ink composition.

A humectant is added to the composition of the invention to help prevent the ink from drying out or crusting in the orifices of the ink jet printhead. Polyhydric alcohols useful in the composition of the invention for this purpose include, for example, ethylene glycol, diethylene glycol, triethylene glycol, propylene glycol, tetraethylene glycol, polyethylene glycol, glycerol, 2-methyl-2,4-pentanediol, 1,2,6-hexanetriol and thioglycol. As noted above, the humectant is employed in a concentration of from about 10 to about 50% by weight. In a preferred embodiment, diethylene glycol or a mixture of glycerol and diethylene glycol is employed a concentration of between 10 and 20 wt. %.

A co-solvent can also be employed in the composition of the invention. The selection of a co-solvent depends on the requirements of the specific application, such as desired surface tension and viscosity, the selected pigment, drying time of the pigmented ink jet ink, and the type of paper onto which the ink will be printed. Representative examples of water-soluble co-solvents that may be selected include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl ethyl ketone and diacetone alcohol; (3) esters, such as ethyl acetate, ethyl lactate, ethylene carbonate and propylene carbonate; and (4) sulfur-containing compounds such as dimethyl sulfoxide and tetramethylene sulfone.

Dispersants which are used in the composition of the invention include sodium dodecyl sulfate, acrylic and styrene-acrylic copolymers, such as those disclosed in U.S. Pat. Nos. 5,085,698 and 5,172,133, and styrenics, such as those disclosed in U.S. Pat. No. 4,597,794. Other patents referred to above in connection with pigment availability also disclose a wide variety of useful dispersants. In a preferred embodiment, potassium or sodium N-methyl-N-oleoyl taurate is used.

Ink Preparation

A preferred method for making the inks of the invention is disclosed in U.S. Pat. No. 5,679,138, the disclosure of which is hereby incorporated by reference. In general, it is desirable to make the pigmented ink jet ink in the form of a concentrated mill grind, which is subsequently diluted to the appropriate concentration for use in the ink jet printing system. This technique permits preparation of a greater quantity of pigmented ink from the equipment. The mill grind can be diluted with either additional water or water-miscible solvents to make a mill grind of the desired concentration. By dilution, the ink is adjusted to the desired viscosity, color, hue, saturation density and print area coverage for the particular application.

Jet velocity, separation length of the droplets, drop size and stream stability are greatly affected by the surface tension and the viscosity of the ink. Pigmented ink jet inks suitable for use with ink jet printing systems should have a pH in the range of 5 to 9.

Acceptable viscosity's are no greater than 20 centipoise, and preferably in the range of about 1.0 to about 10.0 centipoise, more preferably from about 1.0 to about 5.0 centipoise at room temperature.

The ink has physical properties compatible with a wide range of ejecting conditions, i.e., driving voltages and pulse widths for thermal ink jet printing devices, driving frequencies of the piezo element for either a drop-on-demand device or a continuous device, and the shape and size of the nozzle.

A penetrant (0–10 wt. %) may also be added to the ink composition of the invention to help the ink penetrate the receiving substrate, especially when the substrate is a highly sized paper. A preferred penetrant for the inks of the present invention is n-propanol at a final concentration of 1–6 wt. %.

A biocide (0.01–1.0 wt. %) may also be added to prevent unwanted microbial growth which may occur in the ink over time. A preferred biocide for the inks of the present invention is Proxel® GXL (Zeneca Colours Co.) at a concentration of 0.05–0.5 wt. %. Additional additives which may optionally be present in ink jet inks include thickeners, conductivity enhancing agents, anti-kogation agents, drying agents, and defoamers.

Ink-receptive substrates useful in ink jet printing are well known to those skilled in the art. Representative examples of such substrates are disclosed in U.S. Pat. Nos. 5,605,750; 5,723,211; and 5,789,070 and EP 813 978 A1, the disclosures of which are hereby incorporated by reference.

Commercially available ink jet printers use several different methods to control the deposition of the ink droplets. Such methods are generally of two types: continuous stream and drop-on-demand.

In drop-on-demand systems, a droplet of ink is ejected from an orifice directly to a position on the ink receptive layer by pressure created by, for example, a piezoelectric device, an acoustic device, or a thermal process controlled in accordance with digital data signals. An ink droplet is not generated and ejected through the orifices of the print head unless it is needed.

The following examples illustrate the utility of the present invention.

EXAMPLES

Example 1

Control Example 1 (C-1)

| Mill Grind | |
|---|---|
| Polymeric beads, mean diameter of 50 μm (milling media) | 325.0 g |
| C.I. Pigment Yellow 155 From Clariant Corp. | 30 g |
| Oleoyl methyl taurine, (KOMT) potassium salt | 7.5 g |
| Deionized water | 208.0 g |
| Proxel GXL ® (biocide from Zeneca) | 0.2 g |

The above components were milled in a 2 liter double walled vessel obtained from BYK-Gardner using a high energy media mill manufactured by Morehouse-Cowles Hochmeyer. The mill was run for approximately 8 hours at room temperature. The dispersion was separated from the milling media by filtering the millgrind through a 4–8 μm KIMAX® Buchner Funnel obtained from VWR Scientific Products. An aliquot of the above dispersion containing 2.9 g pigment was mixed with 16.0 g diethylene glycol (DEG) and additional deionized water for a total of 100.0 g.

Control Example 2 (C-2)

This composition was prepared the same as C-1 except that it contained C.I. Pigment Blue 15:3 instead of C.I. Pigment Yellow 155 and an aliquot of this dispersion was used containing 1.75 g of pigment to mix with the DEG and water.

Control Example 3 (C-3)

This composition was prepared the same as C-2 except that it contained 0.6 g of an acetylenic diol, Surfynol® 465 (Air Products Co.).

Control Example 4 (C-4)

This composition was prepared the same as C-2 except that it contained 0.6 g of a secondary alcohol ethoxylate, Tergitol® 15-S-7 (Union Carbide Corp.) which is a mixture of linear secondary alcohols reacted with ethylene oxide.

Invention Example 1 (I-1)

This composition was prepared the same as C-1 except that it also contained 0.6 g of an ethoxylated surfactant, Tergitol® TMN-10 (Union Carbide Corp.).

Invention Example 2 (I-2)

This composition was prepared the same as C-2 except that it also contained 0.3 g of an ethoxylated surfactant, Tergitol® TMN-10 (Union Carbide Corp.).

Invention Example 3 (I-3)

This composition was prepared the same as I-2 except that the Tergitol® TMN-10 was employed at 0.6 g.

Invention Example 4 (I-4)

This composition was prepared the same as I-3 except that the pigment was C.I. Pigment Red 122 at 2.9 g.

Ink Reliability Testing

An apparatus that will fire a single nozzle of a 104 nozzle ink cartridge utilized to print each colored ink in the Kodak Professional 2042 Wide Format Inkjet Printers was designed and assembled. Crossover reliability testing between wide format printers and the single nozzle test apparatus (SNTA) indicated that delivery of 1.8 to 2.0 ml of ink in the SNTA, before the nozzle failed, was equivalent to delivery of 700 to 1000+ ml of ink from a cartridge in a printer before one nozzle failed. The following results were obtained:

TABLE 1

| Element | Nozzle (ml) |
|---------|-------------|
| C-1 | 0.83 |
| C-2 | 1.75 |
| C-3 | 3.55 |
| C-4 | 0.02 |
| I-1 | 2.08 |
| I-2 | 4.51 |
| I-3 | 5.57 |
| I-4 | 8.24 |

The above results show that the inks of the invention provide superior reliability performance (higher amount of ink delivered before failure) in comparison to C-1 and C-2 which did not contain any surfactant, and C-3 and C-4 which contained control surfactants.

The invention has been described in detail with particular reference to certain preferred embodiments thereof, but it will be understood that variations and modifications can be effected within the spirit and scope of the invention.

What is claimed is:

1. An ink jet ink composition comprising from about 30 to about 90% by weight of water, from about 0.5 to about 30% by weight of a pigment, from about 0.125 to about 7.5% by weight of an anionic dispersant, from about 0.05 to about 2% by weight of an ethoxylated trimethylnonanol, and from about 10 to about 50% by weight of a humectant comprising a polyhydric alcohol.

2. The composition of claim 1 wherein said ethoxylated trimethylnonanol has the formula $C_{12}H_{25}O(CH_2CH_2O)_nH$, where n is from about 3 to about 10, and is made through the reaction of 2,6,8-trimethyl-4-nonanol with ethylene oxide.

3. The composition of claim 1 wherein said ethoxylated trimethylnonanol is present in said composition in an amount of from about 0.075 to about 1.0% by weight.

4. The composition of claim 1 wherein said pigment is C.I. Pigment Yellow 155, C.I. Pigment Blue 15:3, C.I. Pigment Red 122 or C.I. Pigment Black 7.

5. The composition of claim 1 wherein said pigment is present at a concentration of from about 1% to about 5% by weight of said ink jet ink composition.

6. The composition of claim 1 wherein said polyhydric alcohol is diethylene glycol or a mixture of glycerol and diethylene glycol.

7. The composition of claim 6 wherein said polyhydric alcohol is present at a concentration of from about 10 to about 20% by weight of said ink jet ink composition.

8. The composition of claim 1 wherein said anionic dispersant is potassium or sodium N-methyl-N-oleoyl taurate.

* * * * *